July 9, 1929. C. N. BERGMANN 1,720,028
RECEPTACLE FILLING APPARATUS
Filed Oct. 8, 1927
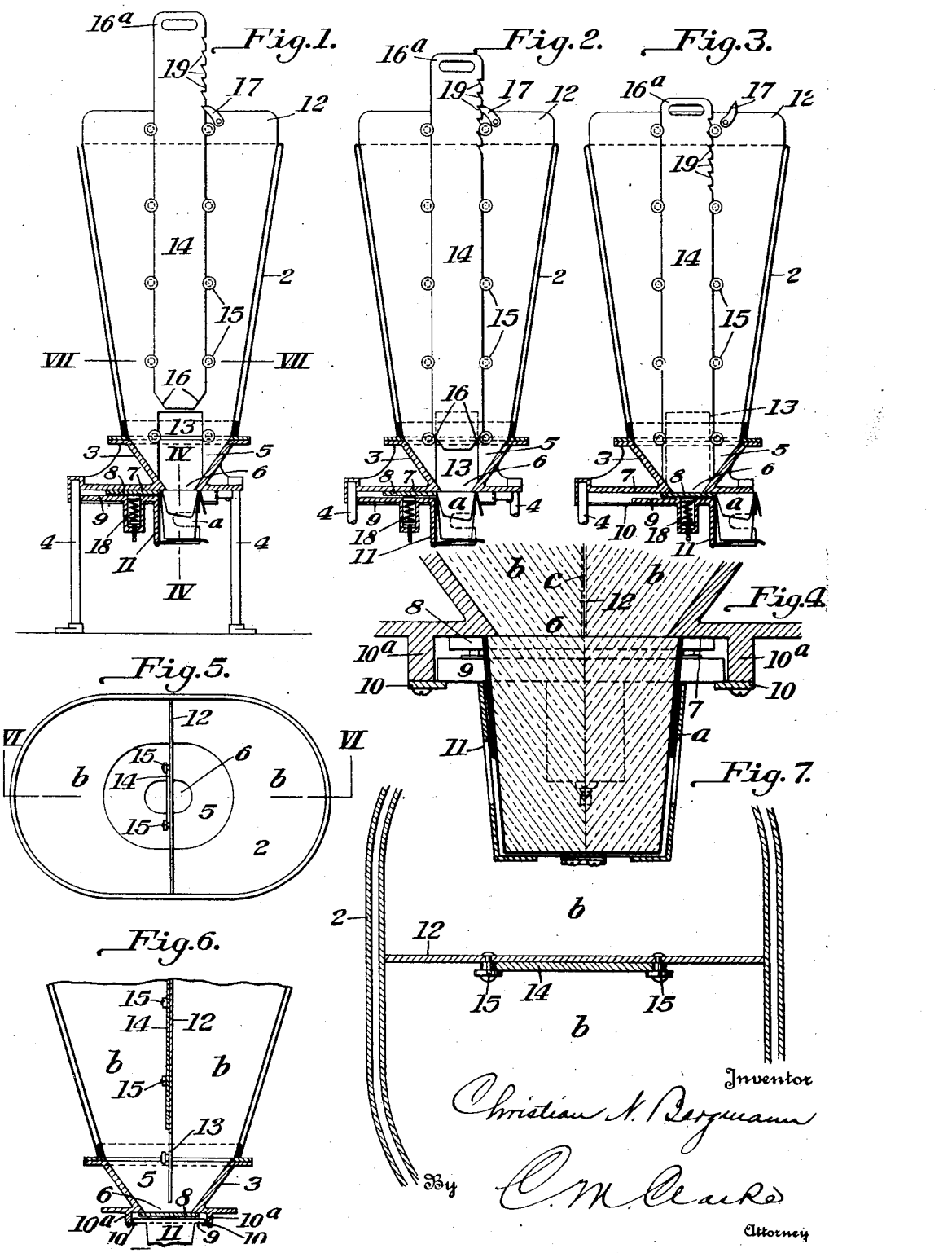

Patented July 9, 1929.

1,720,028

UNITED STATES PATENT OFFICE.

CHRISTIAN N. BERGMANN, OF PITTSBURGH, PENNSYLVANIA, ASSIGNOR TO BERGMANN PACKAGING MACHINE COMPANY, OF PITTSBURGH, PENNSYLVANIA, A CORPORATION OF DELAWARE.

RECEPTACLE-FILLING APPARATUS.

Application filed October 8, 1927. Serial No. 224,863.

My invention refers to improvements in machines for filling ice cream and similar substances, in plastic condition, into boxes or holding receptacles for storage, packing, or use in such individual containers.

The invention has in view to provide simple and efficient means for delivering a plural flavor charge into the container in sections whereby the entire compound unit is composed of two sides, meeting and joined on a transverse closely contacting plane.

The present invention is an improvement in that class of machines shown in my prior Patent No. 1,635,159, issued July 5, 1927.

In the drawings showing one preferred embodiment of the invention,—

Fig. 1 is a vertical sectional view through a filling machine provided with my improvement, showing the partition gate fully open;

Fig. 2 is a similar view showing the gate partly closed;

Fig. 3 is a similar view showing the gate fully closed;

Fig. 4 is an enlarged vertical section on the line IV—IV of Fig. 1, showing a receptacle in receiving position underneath the hopper;

Fig. 5 is a plan view of the hopper, showing the gated partition;

Fig. 6 is a vertical section on the line VI—VI of Fig. 5;

Fig. 7 is an enlarged cross sectional detail view on the line VII—VII of Fig. 1.

In the drawings, 2 is the hopper of a receptacle filling machine, mounted on an inwardly converging delivery base 3 supported on legs 4 and providing the lower delivery cavity 5.

The tapered bottom chamber delivers its contents of semi-frozen or plastic cream downwardly through the opening 6 into the receptacle or carton $a$ which is carried in the open front bracket 11, as shown in the above patent. The bracket 11 forms part of an inwardly and outwardly sliding plate or carriage 9 mounted on strips 10 depending below the side bars $10^a$ of the base, as in Fig. 4.

An opening and closing slide plate or valve 8 is mounted loosely between the carriage 9 and the plane under face 7 of the hopper base, pressed upwardly by a suitable spring 18 and adapted to be moved inwardly and outwardly with the bracket 11. In this manner as the bracket is pushed inwardly the valve plate 8 opens the bottom 6 of the base to deliver into the carton $a$ when it is in register, and closes the opening with a shearing severance flush with the top of the carton, when it is withdrawn.

For the purpose of providing a double sided hopper for two flavors or colors of cream, etc., the hopper 2 is provided with a transverse partition 12 extending from its top clear down into the coniform terminal chamber 5. At its middle lower portion the partition is cut out, as at 13, upwardly above the bottom face 7 and sufficiently wide, to allow ample flow of cream from each cavity $b, b$, downwardly through the middle outlet opening 6 into the receptacle.

For the purpose of closing the opening 13 I mount a partition gate in the form of a flat sliding strip or plate 14 at one side of the partition in guiding studs 15 whereby the slide may be lifted for a full opening, or partly closed, or fully closed, as in Figs. 1, 2 and 3.

The lower end of the cut-off plate is preferably chamfered to fit the tapered inner faces, as at 16, and it has an upper hand grip $16^a$ for raising and lowering. A holding dog 17 pivoted to the partition engages one of several notches 19 so as to hold the slide in open or partly open position, as desired.

In using the machine, the bracket is normally withdrawn, closing the bottom opening by valve plate 8, as in Fig. 3.

With the partition gate 14 lowered, each compartment $b, b$, is thus isolated from the other so that the two sides of the hopper may be filled to the top with plastic cream.

The partition gate 14 is then lifted, allowing the contents at each side to meet on the common transverse vertical plane of the comparatively thin partition 12, as at $c$.

As the cream flows downwardly into the receptacle $a$ the entire cavity is filled with the two columns of cream, meeting on the transverse plane $c$ which continues sharply defined throughout the depth of the entire filling unit. Likewise, the inner faces of the falling mass in each hopper side are flat, confronting each other, so that immediately the opening 13 is reached, these flat faces engage each other and firmly adhere.

The descent of the double-sided column is thus assisted and regulated, so that any tendency to acceleration or retardation at either side, due to different consistency or other causes, is neutralized, and the compound column moves downwardly at a uniform rate at each side.

The resulting effect is that each receptacle is filled with the same amount of each flavor or color of cream at each operation, and when equally divided, equal original amounts will empty together. The receptacles may be filled at the same speed as with a single flavor single column machine, due to the merging together and adherence of the columns prior to their entrance into the receptacle.

The construction and arrangement of the hopper may be changed or varied from that shown, as by utilizing two individual hoppers, brought together at the bottom, with a common valve controlled outlet and an adjustable partition slide, of any suitable form. The two descending streams of cream merge together, forming a two-part composite column, capable of delivery into each receptacle at each operation, with a symmetrical and continuously uniform adhering division at the approximately middle line of the two flavors used.

What I claim is:

1. In a receptacle filling apparatus, the combination with a supply reservoir having a bottom outlet opening, and a closing gate therefor, of a dividing partition across the reservoir having a circulation opening therethrough extending upwardly above the lower edges of the partition.

2. In a receptacle filling apparatus, the combination with a supply reservoir having a bottom outlet opening, and a closing gate therefor, of a dividing partition across the upper portion of the reservoir having outer downwardly extending side portions providing a transverse middle opening above the bottom outlet opening and between the side portions.

3. In a receptacle filling apparatus, the combination with a supply reservoir having a bottom outlet opening, of a dividing partition across the reservoir having a circulation opening through its middle portion and means for closing said opening, and a closing gate for the bottom outlet opening adapted to simultaneously control circulation from the reservoir at each side of the partition.

4. In a receptacle filling apparatus, the combination with a supply reservoir having a bottom outlet opening, of a dividing partition across the reservior having a circulation opening therethrough, a partition gate on the partition for closing said opening, and a closing gate for the bottom outlet opening movable in the direction of the plane of said partition and operable to equally open or close circulation at each side of the partition.

5. In a receptacle filling apparatus, the combination with a supply reservoir having a bottom outlet opening, of a dividing partition across the reservoir having a circulation opening therethrough, a partition gate on the opening, means for holding it in varying positions, and a closing gate for the bottom outlet opening movable in the direction of the plane of said partition and operable to equally open or close circulation at each side of the partition.

6. In a receptacle filling apparatus, the combination with a supply reservoir having a bottom outlet opening, of a vertical dividing partition across the upper portion of the reservoir having a transverse opening therethrough above the bottom outlet opening, a cut-off gate slidably mounted on the partition, and a horizontal closing gate movable across the bottom outlet opening simultaneously at each side of the partition to equally open or close circulation at both sides thereof.

7. In a receptacle filling apparatus, the combination with a supply reservoir having a bottom outlet opening, of a vertical dividing partition across the upper portion of the reservoir providing a transverse opening above the bottom outlet opening, a cut-off gate slidably mounted on the partition adapted to open or close the transverse opening of the partition, means for holding the partition at varying heights, and a horizontal closing gate movable across the bottom outlet opening simultaneously at each side of the partition to equally open or close circulation at both sides thereof.

8. The combination with a supply reservoir having a plane under face and an outlet opening therethrough, a transverse vertical partition in the reservoir having a circulation opening at its bottom, a partition gate for opening and closing said opening, and a slidably mounted receptacle support having a valve plate fitting against said under face of equal area at each side of the partition at varying positions of its movement whereby to equally open or close circulation at both sides thereof.

9. The combination with a supply reservoir having a plane under face and an outlet opening therethrough, and a slidably mounted receptacle support having a valve plate fitting against said under face, of a transverse partition in the reservoir having a circulation opening at its bottom, and a partition gate for opening and closing said opening adapted to engage the valve plate, the partition and gate being located in the line of movement of the valve plate.

10. The combination with a supply reservoir having a plane under face and an outlet opening therethrough, and a slidably mounted receptacle support having a valve plate fitting against said under face, of a transverse partition in the reservoir having a circulation opening at its bottom, a partition gate for opening and closing said opening, and means on the partition for guiding the gate.

11. The combination with a supply reservoir having a plane under face and an outlet opening therethrough, and a slidably mounted receptacle support having a valve plate fitting against said under face, of a transverse partition in the reservoir disposed edgewise in the direction of movement of the valve plate and having a middle circulation opening at its bottom, a partition gate for opening and closing said opening, and means on the partition for holding the gate at varying heights.

12. In combination, two oppositely arranged cavity containing hoppers provided with inwardly inclined bottom walls terminating in the transverse plane of a common delivery opening and having a vertical dividing partition plate with a middle upwardly extending opening providing a communicating space above the plane of the delivery opening, and a movable plate mounted on the partition for opening and closing the communicating space.

13. In combination, two oppositely arranged cavity containing hoppers provided with a common horizontal delivery opening and a vertical partition having an opening therethrough providing a communicating space above the horizontal opening, a movable partition plate for opening and closing the partition opening, and a closing gate movable across the horizontal delivery opening for simultaneous and equal opening and closing of circulation from each hopper.

In testimony whereof I hereunto affix my signature.

CHRISTIAN N. BERGMANN.